United States Patent
Singh (12)

(10) Patent No.: US 11,915,229 B2
(45) Date of Patent: Feb. 27, 2024

(54) CURRENCY EXCHANGE SYSTEM AND METHODOLOGY

(71) Applicant: Harpreet Singh, Jacksonville, FL (US)

(72) Inventor: Harpreet Singh, Jacksonville, FL (US)

(*) Notice: Subject to any disclaimer, the term of this patent is extended or adjusted under 35 U.S.C. 154(b) by 588 days.

(21) Appl. No.: 16/775,420

(22) Filed: Jan. 29, 2020

(65) Prior Publication Data
US 2020/0167765 A1 May 28, 2020

Related U.S. Application Data

(63) Continuation-in-part of application No. 15/455,500, filed on Mar. 10, 2017, now abandoned.

(60) Provisional application No. 62/306,313, filed on Mar. 10, 2016.

(51) Int. Cl.
*G06Q 20/38* (2012.01)
*G06Q 20/10* (2012.01)
*G06Q 20/32* (2012.01)

(52) U.S. Cl.
CPC ....... *G06Q 20/381* (2013.01); *G06Q 20/1085* (2013.01); *G06Q 20/3223* (2013.01)

(58) Field of Classification Search
None
See application file for complete search history.

(56) References Cited

U.S. PATENT DOCUMENTS

| | | | | |
|---|---|---|---|---|
| 2013/0018738 A1* | 1/2013 | Faires | ................... | G06Q 20/381 705/16 |
| 2014/0337206 A1* | 11/2014 | Talker | ................ | G06Q 20/0658 705/41 |
| 2015/0012409 A1* | 1/2015 | Toft | ...................... | G06Q 20/381 705/37 |
| 2015/0254770 A1* | 9/2015 | Bondesen | ............ | G06Q 20/381 705/37 |
| 2016/0162869 A1* | 6/2016 | Gupta | ................ | G06Q 20/3221 705/43 |

FOREIGN PATENT DOCUMENTS

| | | | | | |
|---|---|---|---|---|---|
| AU | 2015203621 A1 | * | 7/2015 | ............. | G06Q 20/04 |
| KR | 20120006200 A | * | 7/2010 | ............. | G06Q 40/02 |
| KR | 20120006200 | * | 7/2012 | ............. | G06Q 40/02 |

* cited by examiner

*Primary Examiner* — Bruce I Ebersman
*Assistant Examiner* — Matthew Cobb
(74) *Attorney, Agent, or Firm* — Lippes Mathias LLP; Mitchell Ghaneie; Josephine Chen

(57) ABSTRACT

A method of facilitating the dispensing of foreign currency from a foreign ATM to a user traveling in a foreign country wherein a system provider establishes a system home account and system foreign accounts each funded by deposit of the corresponding local currencies by users of the system.

7 Claims, 4 Drawing Sheets

CURRENCY EXCHANGE SYSTEM AND METHODOLOGY

This application is a continuation-in-part application of U.S. Non-Provisional patent application Ser. No. 15/455,500, filed Mar. 10, 2017, claiming the benefit of U.S. Provisional Patent Application Ser. No. 62/306,313, filed on Mar. 10, 2016, the disclosure of which is incorporated herein by reference.

BACKGROUND OF THE INVENTION

This application relates generally to the field of currency exchange systems for the exchange of one currency for the currency of another nation, and more particularly relates to such systems wherein foreign currencies are obtainable by travelers from automatic teller machines (ATM's) of participating entities.

Obtaining foreign currencies for a trip to another country may currently be accomplished through several systems. In one system the individual buys foreign currencies prior to entering the foreign country, such as at a kiosk located for example in an airport terminal. This necessitates carrying significant amounts of currency, which increases the chance of losing the currency through misplacement or theft. In addition, this option is not available once the traveler has left the airport, except at off-airport exchange entities with unlimited hours of operation. Another system involves purchasing the currency at a foreign bank upon arrival. This requires the traveler to carry large amounts of currency from the country of origin, to purchase traveler checks prior to departure, with the attached surcharge, or to utilize a credit card at the foreign bank. The transaction at the foreign bank will entail fee surcharges, possibly including credit card exchange rate fees, and will require a time expenditure. The transactions must occur during bank operating hours. Still another system involves the use of a credit card at foreign ATM's. Fee surcharges are typically added, and this system requires a physical card, which may be lost or stolen. It is also known to establish a foreign currency account in a bank in the home country, which then issues the traveler a debit card for use in the foreign ATM's. The problem with this system is that very few banks offer this option, the account must be set up well in advance of the trip, and opening the account is typically a complicated process usually requiring in person interaction with bank personnel, rendering it virtually impossible for individuals living in areas not services by a particular offering bank.

It is an object to provide a currency exchange system that addresses the problems associated with the known systems, wherein the system involves the use of a mobile app defining a virtual debit card, the transactions being accomplished via near frequency communication (NFC) between the user's smartphone and a ATM in a destination country. The traveler is able to immediately withdraw destination currency from a destination ATM of the destination country.

It is a further object to provide a system including a plurality of users, wherein each of the users resides in a home country and travels to a destination country. The system provider establishes at least two system accounts, each of which is established in banks of a respective country. Each of the system accounts is funded by participating users residing in the respective country by deposits of the home currency into the system account in the home country of each of the users. Each of the users establishes a user token account maintained by the system provider by depositing home currency into the system account of the home country, which is then credited in the form of virtual tokens to the user token account, the tokens representing the right to convert the home currency into destination currencies within the destination country. To obtain destination currency from a ATM in the destination country, each of the users requests and receives a virtual debit card in the desired amount of destination currency by spending the required amount of tokens from the user token account, the amount calculated at the prevailing exchange rate at the time of creation of the virtual debit card. The virtual debit card, operational with a smartphone, is then used at the destination ATM to obtain an amount of destination currency less than or equal to the amount of destination currency present in the virtual debit card, the destination currency being withdrawn from the system account in the bank of the destination country.

The system eliminates time constraints and location limitations for the establishment of a destination currency account for the exchange of currency, provides a secure exchange process while reducing the risk of needing to carry large sums. The system will also enable the user to carry out exchanges in multiple currencies, provide a means for payment of point of sale purchases with a virtual debit card instead of a credit card, allow the user to deposit surplus currency into a local ATM for credit back to the user, eliminate the need for an actual debit/credit card, provide a lower rate of transaction fees than possible through brick-and-mortar systems, provide an SSL secured website and mobile platform, and/or be compliant with regulations concerning privacy, money laundering, the Patriot Act and the Intelligence Reform & Terrorism Prevention Act of 2004.

SUMMARY

The invention is a system and methodology for facilitating the dispensing of destination currency from a destination ATM that provides an alternative to known systems for obtaining destination currencies. In general, the system is controlled by a system provider and comprises the steps of developing software and providing a mobile application ("app") downloadable to a smartphone to a plurality of users. Each of the users residing in a home country and traveling to a destination country.

The invention is a method and a system wherein the system provider establishes at least two system accounts in at least one bank or financial institution in a respective country, the system accounts being funded by participating users residing in the respective country with deposits of home currency into the system account in the respective country. Each of the users establishes a user token account by the system provider by depositing home currency into the system account in the home country, which is then credited in the form of virtual tokens to each of the users (e.g., one token for one US dollar), the tokens representing the right to convert the home currency into destination currencies within the destination country. To obtain destination currency from a destination ATM, each of the users requests and receives a virtual debit card from the system provider in the desired amount of destination currency by spending tokens from a user sub-account assigned to the desired destination currency, the number of required tokens being determined by the exchange rate at the time of request (e.g., if one US$ equals 1000 JP¥, then the receipt of 100,000 JP¥ from an ATM in Japan would require the conversion of 100 US tokens). The virtual debit card, operational with a smartphone, is then used at the destination ATM to obtain an amount of destination currency less than or equal to the amount of destination currency present in the virtual debit card, the destination currency being withdrawn from the system account in the destination country (e.g., the user requests 50,000 J¥ from an ATM in Japan, whereby his sub-account is reduced by 50 US tokens).

Alternatively, the invention is a method of facilitating the dispensing of destination currency from a destination ATM to a user traveling in a destination country, comprising the steps of establishing a currency exchange system controlled by a system provider, the currency exchange system comprising a plurality of users, each of the users residing in a home country and traveling to a destination country, establishing system accounts in at least one financial institution in a respective country for a system provider, the system accounts being controlled by the system provider, and wherein each of the system accounts is funded by users residing in the respective country with deposits of home currency; providing a mobile app to each of the users accessible by a smartphone, said mobile app in electronic communication with said financial institution in the home country, said mobile app enabling each of the users to transfer home currency to said system account in the home country; each of the users transferring an amount of home currency to said system home account in the home country; said system provider creating a user token account having an amount of virtual home tokens equal in value to the amount of home currency deposited to said system account in the home country by each of the users; each of the users requesting a virtual debit card in an amount of destination currency from said destination country having one of said system accounts; said system provider creating a user sub-account and crediting said user sub-account with the requested amount of destination currency and debiting from said user token account the amount of virtual tokens equal in value to said amount of destination currency calculated at the prevailing rate of exchange at the time of creating said user sub-account; said system provider delivering to each of the users a virtual debit card credited in the amount of destination currency requested by each of the users, said virtual debit card accessible and operational through said mobile app; each of the users, once in said destination country, inputting through said mobile app secure information to said one of said financial institutions in the destination country and requesting an amount of destination currency to be dispensed by said ATM in the destination country, said mobile app being adapted to communicate electronically with said ATM in the destination country; said one of said financial institutions in the destination country communicating with said financial institution in the residence country and verifying the identity of each of the users and the presence of sufficient funds in said user sub-account; said one of said financial institutions dispensing said destination currency from said ATM in the destination country to each of the users only after the identity of said user has been verified and the presence of sufficient funds in said user sub-account has been verified; and debiting said destination currency from said systems account in the destination country. Furthermore, such method further comprising the steps of each of the users, once in said destination country, inputting through said mobile app secure information to a non-participating financial institution not having a system account and requesting an amount of destination currency to be dispensed by a ATM of said non-participating financial institution, said mobile app being adapted to communicate electronically with said ATM of said non-participating financial institution; said non-participating financial institution in the destination country communicating with said financial institution in the residence country and verifying the identity of each of the users and the presence of sufficient funds in said user sub-account; said non-participating financial institution in the destination country dispensing said destination currency from said ATM in the destination country to each of the users only after the identity of said user has been verified and the presence of sufficient funds in said user subaccount has been verified; and said system provider debiting said destination currency from said systems account in the destination country and reimbursing said non-participating financial institution in the destination currency from said systems account of said one of said foreign financial institutions in the destination country.

DETAILED DESCRIPTION OF THE INVENTION

In general, the invention is a system and methodology in various embodiments that provides an alternative to known systems for obtaining destination currencies in a destination country. As used herein, the term "home" shall be used to refer to the home country of the user residing in and will be illustrated herein as the United States, and the term "destination" shall refer to a non-home country in which the user is travelling and desires to obtain currency of that country from an ATM.

In general, the invention is an interconnected system of Internet-enabled hardware components and interconnected financial entities comprising servers and interconnected communication systems, the system including in this instance enabled and controlled by a mobile software application downloaded onto or accessible from a smartphone or similar portable computing device, that facilitates the dispensing of destination funds from an ATM. The system and method provide an infrastructure to enable communication between currency exchange system servers and other system components that communicate between member financial institutions in different countries, ATM's in different countries, and multiple traveling individuals, as well as initiation and administration of various currency accounts. The system incorporates a mobile application ("app") in communication with an operational server.

The currency exchange system and app may provide multi-functionality in addition to the basic account management functions of initial sign-up and subsequent log-in and currency transfer. The mobile app may also preferably provide an ATM locator (via GPS, GPRS or Wi-Fi), means to contact the system operators and means to provide feedback.

Furthermore, the system and methodology may be utilized to obtain foreign currency by direct interaction with foreign bank personnel or to obtain goods or services via point-of-sale (POS) systems.

Figure 1:
FIG. 1 is an overview schematic of an embodiment of the system and method which utilizes virtual tokens.
Figure 2:
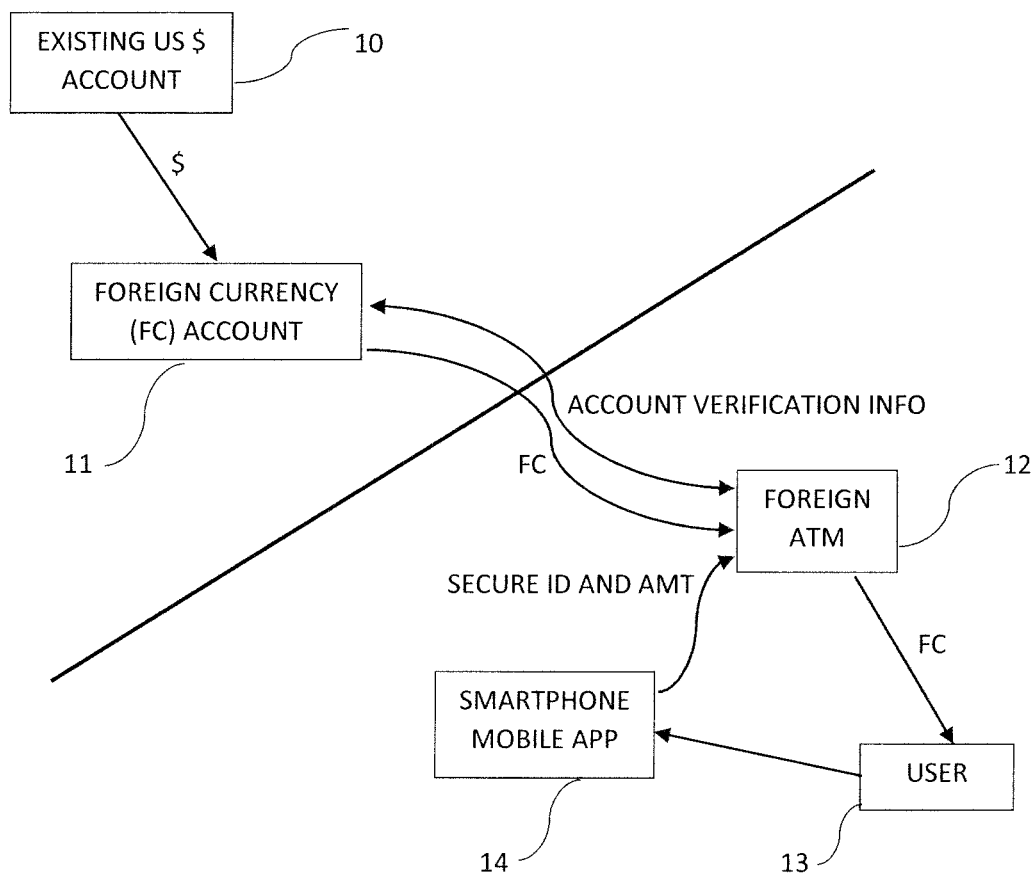
Figure 3:
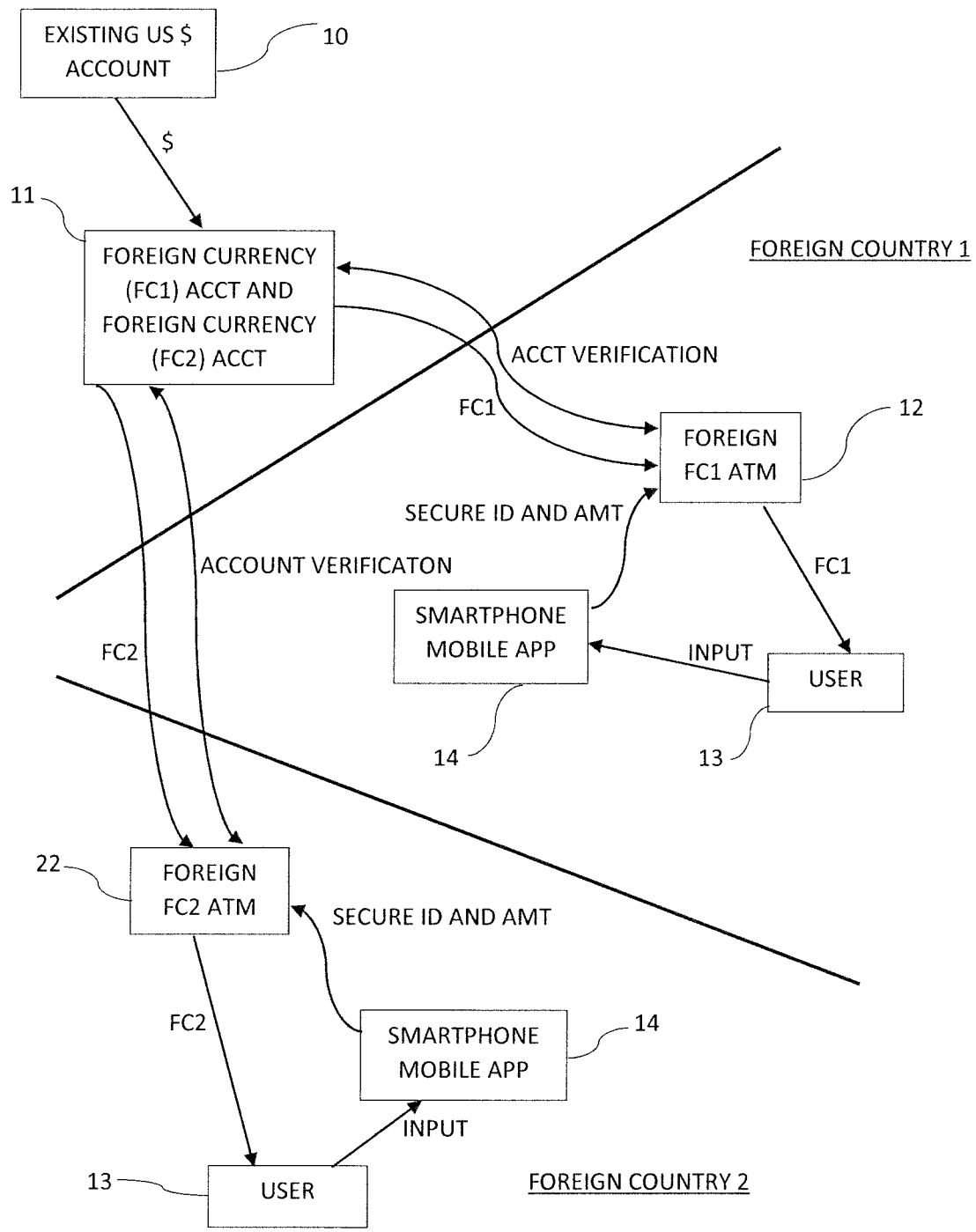
Figure 4:
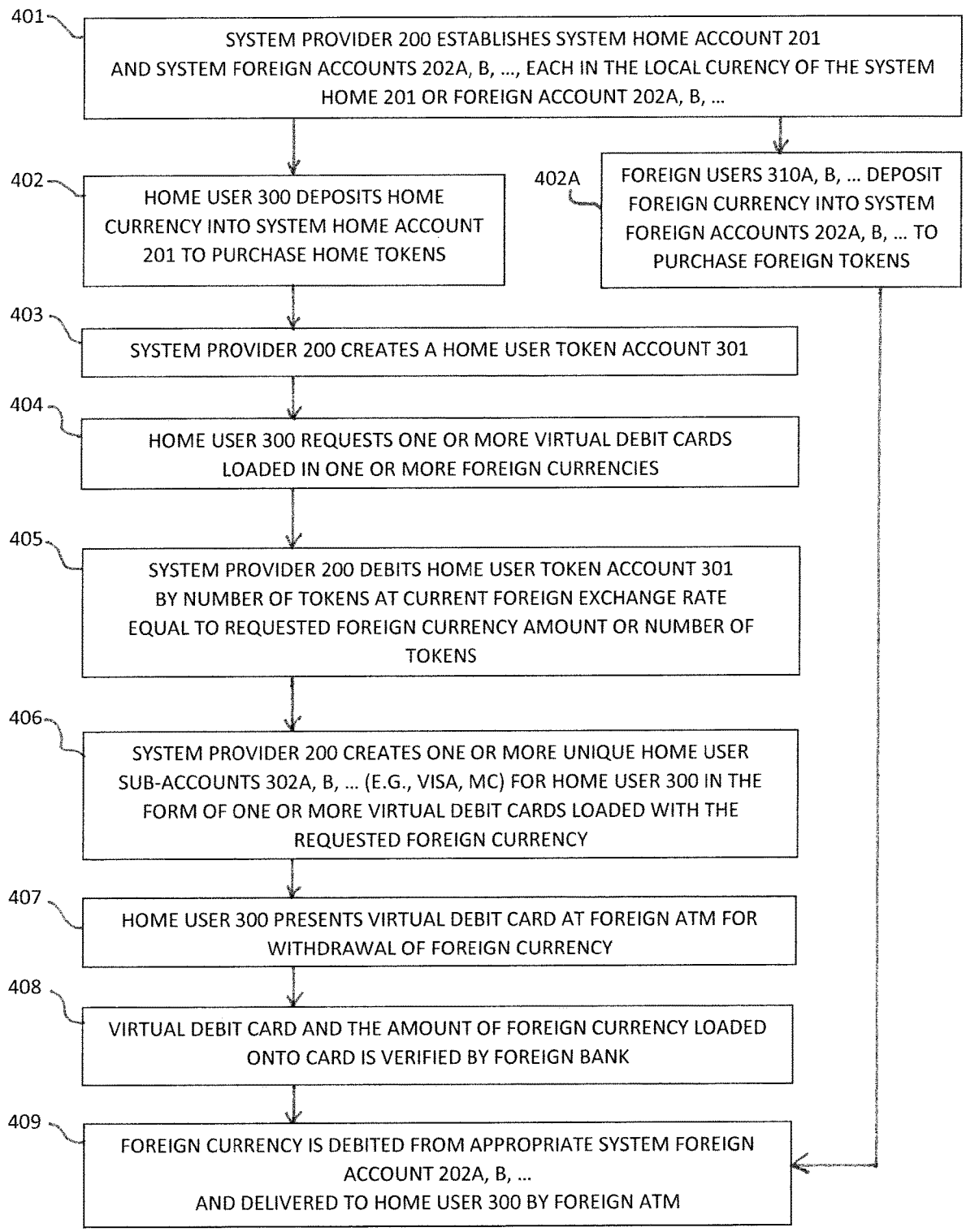

An embodiment for the method and system of the invention is illustrated in FIG. 1. In this embodiment, a system provider 200 establishes 401 actual system accounts 201, 202, 203, . . . in banks or institutions in respective countries, the system accounts 201, 202, 203 being funded in the bank or financial institutions by participating users 300, 301, 302 in the home country with deposits of home currency into the system accounts 201, 202, 203. For example, for US users, the US being designated as the home country, the system provider 200 establishes a system account 201 in a US bank and funded in US dollars. Initial funding for the US system account 201 is provided by the system provider 200, but eventually the system account 201 in the US is funded by users 300 residing in the US and participating in the system.

Concurrently other system accounts 202, 203 . . . are established by the system provider 200 in banks or financial institutions in respective countries. Additional system accounts may be subsequently created to broaden the scope of the system into additional countries. As with the system account 201 in the US, initial funding for the other system accounts 202, 203 in other country is provided by the system provider 200, but eventually the other system accounts 202, 203 is funded by the users 301, 302 participating in the system from the respective country.

For example, a US user 300 establishes a user token account 310 created and maintained by the system provider 200 by depositing 402 home currency (US$) into the system account 201 in the US, which is then credited to the user token account 310 in the form of virtual tokens issued to the US user 300. Alternatively expressed, the US user 300 is purchasing virtual home tokens, the virtual home tokens representing the right to convert the home currency into destination currencies obtainable within the destination country. Thus, for example, a US user 300 might deposit $1000 into the system account 201 in the US in exchange for 1000 US tokens (one token being equal to one US$), which are maintained on record in the user's token account 310 created 403 by the system provider 200. The term "US user" as used herein is representative of multiple US users, as the system and method requires multiple deposits of home currency funds of the respective country.

Concurrently, a Japanese user 301 establishes a user token account 311 tied to a system account 202 in Japan maintained by the system provider 200 by depositing 402A home currency of a Japan, which is JP¥ (Yen) into the system account 202 in Japan, which is then preferably credited in the user token account 311 of a Japanese user, maintained by the service provider 200, in the form of virtual tokens issued to the Japanese user 301. For example, with a system account 202 in Japan established by the system provider 200 in a Japanese bank, a Japanese national might establish 403A the user token account 311 by depositing 500,000 JP¥ (Yen) into the system account 202 in Japan in exchange for 500,000 JP tokens (each Yen token equal to one JP¥). Note that from the perspective of the Japanese national, Japan is the "home" country and the US and France, for example, would be "destination" countries. The term "Japanese user" as used herein is representative of multiple Japanese users, as the system and method requires multiple deposits of home currency funds of the respective country.

Likewise, a French user 302 establishes a user token account 312 tied to a system account 203 in France maintained by the system provider 200 by depositing 402B French currency which is € (Euros) into the system account 203 in France, which is then preferably credited in the user token account 312, maintained by the service provider 200, in the form of tokens issued to the French user 302. For example, with the system account 203 established in a French bank, a French national might establish 403B a user token account 312 by depositing 500 € (Euros) into the system account 203 in France in exchange for 500 Euro tokens (each Euro token equal to one €). Note that from the perspective of the French national, France is the "home" country and the US and Japan, for example, would be "destination" countries. The term "French user" as used herein is representative of multiple French users, as the system and method require multiple deposits of home currency funds of the respective country.

The system provider 200 partners with a worldwide debit card provider, such as Visa or Mastercard, whereby the service provider 200 is able to provide a virtual debit card linked to a sub-account 320A/321A/322A associated with a particular user 300/301/302 and a particular destination currency, and which is linked to a particular system account 201/202/203 in the destination country. The sub-account 320A/321A/322A may take the form of a 16-digit account number that allows withdrawal of funds from a particular system account 201/202/203, but only up to the amount loaded onto the virtual debit card.

To obtain destination currency from a destination ATM, the home user 300/301/302 requests 404/404A/404B from the service provider 200 a particular destination currency amount that is desired to be obtained when the user 300/301/302 is in the destination country. The user token account 320/321/322 is debited 405/405A/405B and the system provider 200 creates 406/406A/406B a user sub-account 320A/321A/322A associated with the user 300/301/302 and the particular system account 201/202/203 in the chosen destination country, the user token account 320/321/322 being debited the number of virtual home tokens equal to the desired amount of destination currency at the time of creation of the user-sub-account 320A/321A/322A and transfer of tokens, at the current exchange rates. The user 300/301/302 then receives a virtual debit card from the system provider 200 loaded in the desired amount of destination currency. To withdraw the money, the user 300/301/302 presents 407/407A/407B the virtual debit card at a bank ATM in the destination country, the account information being transferred for example by near field communication (NFC) technology, the bank in the destination country verifies 408, 408A, 408B the virtual debit card and amount, debits 409/409A/409B the system account 201/202/203 in the destination country and delivers the destination currency to the user 300/301/302.

For example, a US user 300 traveling to Japan may request a virtual debit card loaded with 30,000 JP¥. If at the exchange rate current at the time of this request 30,000 JP¥ equal US$282, then the US user 300 is exchanging or converting 282 US tokens from his/her user token account 310. The system provider 200 reduces the user token account 310 by 282 home tokens, credits the user sub-account 310A with 30,000 JP¥ and issues a virtual debit card with a unique 16-digit account number to the US user 300 in the amount of 30,000 JP¥, the virtual debit card being associated with a Japanese system account 202. The US user 300 may now obtain Yen in Japan at an ATM or bank in which the Japanese system account 202 is maintained by providing via the smartphone the virtual debit's card unique 16-digit account number and requesting an amount of Yen. After confirmation that the 16-digit account number and user sub-account 310A is valid, and that there are sufficient funds (in Yen) loaded onto the virtual debit card to cover the amount of Yen requested, the desired amount of Yen is withdrawn from the Japanese system account 202 and delivered to the traveling US user 300 through the ATM. Furthermore, the US user 300 may obtain Yen from a nonparticipating financial institution in similar manner, (i.e., a financial institution not having a system account 202 . . . in Japan) with the non-participating Japanese financial institution being directly reimbursed in Yen transferred from the Japanese system account 202 of the participating institution in Japan.

Because the US$ to JP¥ exchange rate at the time of creation of the user sub-account 310A was used to determine the number of tokens for equivalency at the time system provider 200 established the user sub-account 310A for the US user 300, it is immaterial when or how often the US user 300 obtains JP¥ as the Japanese system account 202 receives deposits only in JP¥ from Japanese users 301 establishing their user token accounts 311A. In other words, the equivalent monetary values for each currency exchange has already been set. Additionally, the reimbursement of JP¥ provided to the US user 300 from a non-participating institution is a JP¥ to JP¥ transaction, such that again there are no concerns for fluctuation in exchange rates over time.

Similarly, if the US user 300 then travels to France and has obtained a user sub-account 320B from the service provider 200 and a virtual debit card loaded in Euros, by exchanging or spending the necessary amount of US home tokens from the user token account 320 dependent upon the exchange rate at the time of the request, he/she may withdraw Euros from a French ATM in the same manner.

Should the US user 300 have excess Yen or Euros remaining on the virtual debit card after returning to the US, he/she may re-convert the Yen or Euros into US home tokens deposited into the user token account 320 at the exchange rate at the time of re-conversion. The system works in similar manner for other users 301/302 traveling in the US, for example. The foreign currencies are segregated, meaning that the destination currencies are not transferable between destination countries, such as Yen for Euros.

A key advantage to this system is that there are no ongoing exchange rate issues no matter when or how often the user obtains the destination currency, since the desired amount of destination currency is calculated at the prevailing exchange rate at the time of creation of the virtual debit card by spending the required amount of tokens from the user token account.

In commerce, the system provider 200 will establish transaction fees for each user sub-account 320A/321A/322A . . . as it is created, which will be debited from the system account 201/202/203. Likewise, foreign institutions will be able to charge transaction fees for the ATM withdrawals.

The tokens may be fractionalized as needed to provide for exact currency exchanges. The tokens are not transferable by the users 300/301/302. The virtual debit card may be used at any ATM in the same manner that a physical debit card issued by one bank may be used to withdraw cash from the ATM of another bank.

It is understood and contemplated that substitutions and equivalents for certain steps, elements, architectural components and the like described above may be obvious to those with skill in the art, and therefore the true scope and definition of the invention is to be as set forth in the following claims.

I claim:

1. A method of facilitating the dispensing of destination currency from a destination ATM to a user traveling to a destination country, comprising the steps of:
   establishing a currency exchange system controlled by a system provider;
      wherein the currency exchange system comprises a plurality of users, each of the users residing in a home country and traveling to a destination country;
      wherein the currency exchange system comprises at least two system accounts established for the system provider in at least one financial institution in a respective country; wherein each of the system accounts is funded by the users residing in the respective country with deposits of home currency, the system accounts being controlled by the system provider;
   providing a mobile app to each of the users accessible by a smartphone, the mobile app in communication with the financial institution in the home country, the mobile app enabling each of the users to transfer home currency to the system account in the home country;
   each of the users transferring an amount of home currency to the system account in the home country;
   the system provider creating a user token account to each of the users, wherein the user token account has an amount of virtual home tokens equal in value to the amount of home currency deposited to the system account of the home country by each of the users;
   the system provider creating a user sub-account to each of the users and crediting the user sub-account with the requested amount of destination currency and debiting from the user token account the amount of virtual tokens equal in value to the amount of destination currency calculated at the prevailing rate of exchange at the time of creating the user sub-account;
   the system provider delivering to each of the users a virtual debit card crediting in the amount of destination currency requested by each of the user, the virtual debit card accessible and operational through the mobile app;
   each of the user, once in the destination country, requesting an amount of destination currency, the mobile app being adapted to communicate electronically with the destination ATM;
   the financial institution in the destination country verifying the presence of sufficient funds in the user sub-account;
   the financial institution in the destination country dispensing the destination currency from the destination ATM to each of the user only after the presence of sufficient funds in the home user sub-account has been verified; and
   debiting the destination currency from the system account in the destination country.

2. The method of claim 1, further comprising the steps of:
   each of the users, once in the destination country, inputting through the mobile app secure information to the at least one of the financial institutions in the destination country;
   the at least one of the financial institutions in the destination country verifying the identity of each of the users; and
   the at least one of the financial institutions in the destination country dispensing the destination currency only after the identity of each of the users has been verified.

3. The method of claim 1, further comprising the steps of:
   each of the users, once in the destination country, requesting an amount of destination currency to be dispensed by a destination ATM from a non-participating financial institution not having a system account, the mobile app being adapted to communicate electronically with the destination ATM of the non-participating financial institution;
   the non-participating financial institution in the destination country verifying the presence of sufficient funds in the user sub-account;
   the non-participating financial institution in the destination country dispensing the destination currency only after the presence of sufficient funds in the user sub-account has been verified; and the system provider debiting the destination currency from the system account in the destination country and reimbursing the non-participating financial institution in the destination currency from the system account of the at least one financial institution in the destination country.

4. The method of claim 3, further comprising the steps of:

each of the users, once in the destination country, imputing through the mobile app secure information to the at least one of the financial institutions in the destination country, the mobile app being adapted to communicate electronically with the destination ATM of the non-participating financial institution;

the non-participating financial institution in the destination country verifying the identity of each of the users; and the non-participating financial institution in the destination country dispensing the destination currency only after the identity of each of the users has been verified.

5. The method of claim 1, wherein the virtual home tokens are not transferable by the plurality of users.

6. The method of claim 1, wherein each of the users requests a plurality of destination currencies in a plurality of destination countries.

7. The method of claim 6, wherein the destination currencies are not transferable between destination countries.

* * * * *